United States Patent
Jones et al.

(10) Patent No.: US 6,571,906 B2
(45) Date of Patent: Jun. 3, 2003

(54) UNDERWATER SOUND MITIGATION SYSTEM FOR EXPLOSIVE TESTING

(75) Inventors: William S. Jones, Panama City Beach, FL (US); Holly Santoli, Panama City, FL (US); Robert P. Richter, West Palm Beach, FL (US); Carmen M. Ferrer, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/932,726

(22) Filed: Aug. 20, 2001

(65) Prior Publication Data

US 2003/0034197 A1 Feb. 20, 2003

(51) Int. Cl.[7] .................................................. G01V 1/06
(52) U.S. Cl. ........................ 181/117; 181/110; 181/113; 181/115; 181/116; 181/118; 181/119; 181/120; 367/23; 367/141; 367/144; 367/145
(58) Field of Search ................................. 181/118, 115, 181/113, 116, 117, 120, 119, 110; 367/141, 144, 145, 23

(56) References Cited

U.S. PATENT DOCUMENTS 2,954,090 A * 9/1960 Burg et al. .................. 181/110

* cited by examiner

*Primary Examiner*—Robert E. Nappi
*Assistant Examiner*—Renata McCloud
(74) *Attorney, Agent, or Firm*—Harvey A. Gilbert; Donald G. Peck

(57) ABSTRACT

A sound mitigation system and method reduce the transmission of acoustic output from explosions underwater. The system is submerged to bottom terrain of a body of water and has at a series of gas-generating devices providing volumes of gas that are fed to refractory heat resistant tubing assemblies and flexible general tubing assemblies. The heat resistant and general tubing assemblies extend between adjacent gas generating devices and are provided with at least one row of holes to vent bubbles of gas and form a virtually continuous curtain of bubbles rising to the surface of the water between detonating explosives and areas of interest. The curtain of bubbles mitigates the effects of the explosions on marine mammals and endangered, threatened, or protected species within an area adjacent to the explosions.

19 Claims, 2 Drawing Sheets

UNDERWATER SOUND MITIGATION SYSTEM FOR EXPLOSIVE TESTING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a system and method to reduce sound underwater. More particularly, this invention reduces the transmission of acoustic output from underwater explosions to mitigate the effects on marine mammals and endangered, threatened, or protected species within the vicinity of the explosions.

Exploding live ordnance during training exercises and testing explosives generally tend to attract unfavorable attention. The intense shock waves that have been created by unrestricted underwater detonations have taken their toll of marine life, and in some cases, steps are being taken to restrict this activity. Particularly when explosives are detonated underwater near the shore and in some other regions in the ocean, environmentalists are alarmed by the effects of explosions on all aspects of the marine habitat.

However, an important part of an effective research and development program for national defense purposes is thorough testing of new explosive compounds and ordnance items in their intended underwater applications. Extensive underwater testing often must take place to see if innovative designs can survive in the harsh marine environment and function sell enough to assure successful completion of a mission.

Thus, in accordance with this inventive concept, a need has been recognized in the state of the art for a system and method to reduce the acoustic output created by detonations of explosives underwater from reaching areas of interest to mitigate impact on marine mammals, fish, and the marine ecosystem as a whole.

SUMMARY OF THE INVENTION

An object of the invention is to provide a system and method to reduce the transmission of acoustic outputs caused by detonations of explosives underwater.

Another object of the invention is to provide a system and method to mitigate the effect of underwater explosions on marine mammals and endangered, threatened, or protected species within an area adjacent to the explosions.

Another object of the invention is to provide a system and method to form a curtain, or wall of bubbles between underwater explosions and areas of concern.

Another object of the invention is to provide a system and method to form a curtain, or wall of bubbles from gas generating devices that have gas producing means activated by a control unit.

Another object of the invention is to provide a system and method to form a curtain, or wall of bubbles vented from holes in tubing assemblies to extend from the bottom to the surface of a body of water between detonating explosives and areas of concern.

Another object of the invention is to provide a system on the bottom of a body of water to percolate a curtain of bubbles upward through the water to mitigate shock waves from detonating explosives.

Another object of the invention is to provide a system at the surface of a body of water to drop a wall, or curtain of particulate-like matter, such as sand, to mitigate the shock waves travelling from detonating explosives.

Another object of the invention is to provide a system and method to mitigate shock waves from detonating explosives by venting bubbles through a series of holes in elongate tubing assemblies located between the explosives and areas of concern.

Another object of the invention is to provide a system and method to mitigate shock waves from detonating explosives on areas of concern by venting bubbles through a series of holes that may be differently sized in elongate tubing assemblies located between the explosives and areas of concern.

Another object of the invention is to provide a system and method to mitigate shock waves from detonating explosives on areas of concern by using gas generating devices to create volumes of an environmentally friendly gas and force the gas volumes through tubing assemblies and into ambient water as a curtain of bubbles.

These and other objects of the invention will become more readily apparent from the ensuing specification when taken in conjunction with the appended claims.

Accordingly, the sound mitigation system and method of the invention reduce transmission of acoustic outputs from explosions underwater. The system is submerged to bottom terrain of a body of water and has at a series of gas-generating devices providing volumes of gas that are fed to elongate tubing assemblies. The tubing assemblies extend between adjacent gas generating devices and are provided with at least one row of holes to vent bubbles of gas and form a virtually continuous curtain of bubbles rising to the surface of the water between detonating explosives and areas of interest.

DESCRIPTION OF THE PREFERRED EMBODIMENT

Figure 1:
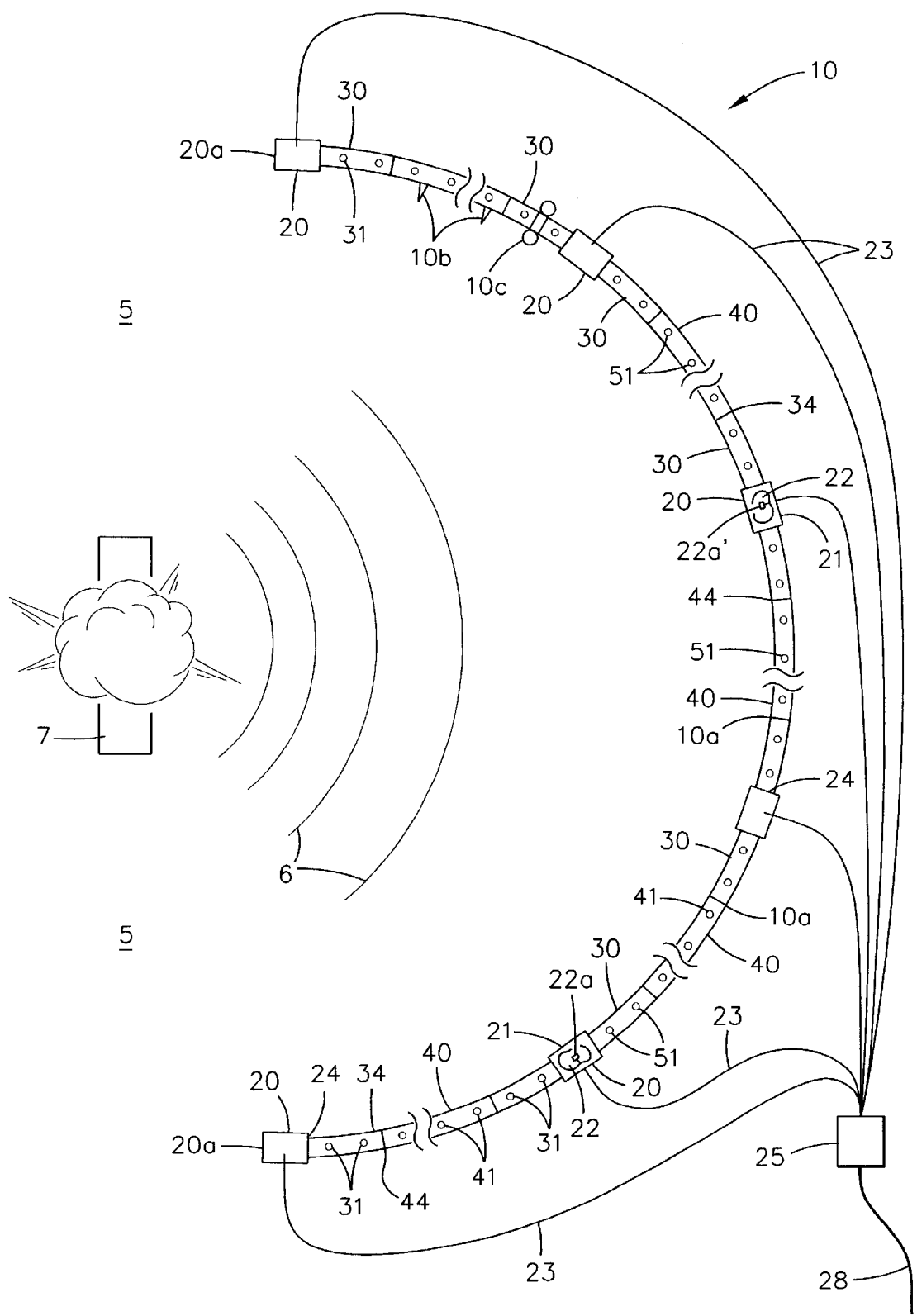
FIG. 1 is a schematic view of the system of the apparatus of the invention for reducing the transmission of acoustic shock waves created by underwater detonations of explosives to areas of interest.
Figure 2:
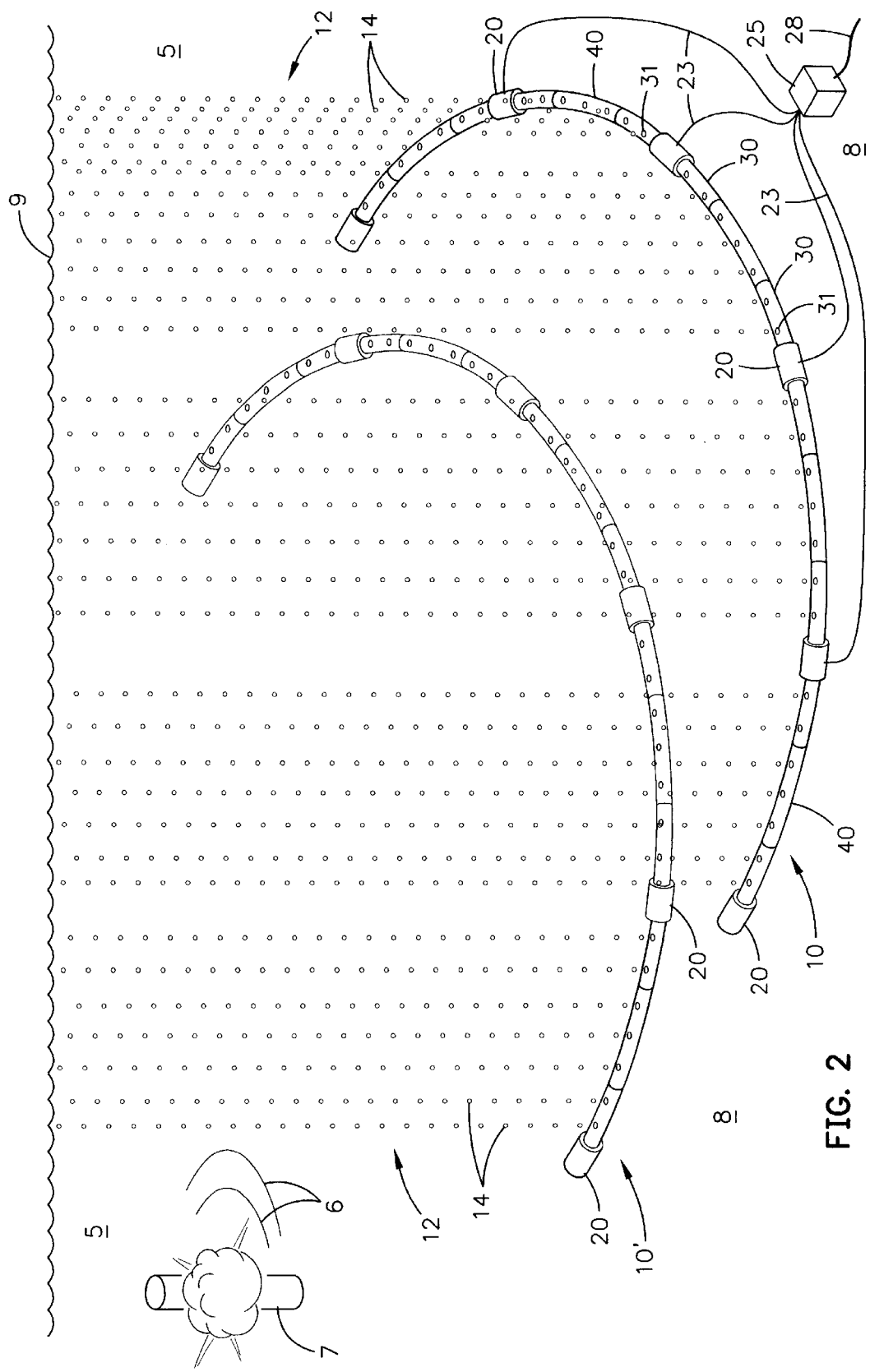
FIG. 2 is an isometric schematic view of the invention emitting at least one curtain of gas bubbles through ambient water between exploding explosives and an area of interest.

Referring to FIGS. 1 and 2, sound mitigation system 10 of this invention has a plurality of gas generating devices 20 connected to a plurality of heat resistant tubing assemblies 30 and general tubing assemblies 40. Sound mitigation system 10 creates a curtain, or wall 12 of bubbles 14 extending along its length to reduce the transmission through ambient water 5 of the acoustic outputs, or shock waves 6 that are created during underwater detonation of explosives 7. Unmitigated pressures of such shock waves 6 can have an adverse impact on the marine environment in the vicinity, or area adjacent to the detonations.

Sound mitigation system 10 can be made in modularized form that each has selected numbers of gas generating devices 20 interposed among elongate heat resistant tubing assemblies 30 and elongate general tubing assemblies 40. This feature permits serial connection of more that one such systems 10 along mating junctures 10a so that a curtain of bubbles 14 can extend for as far as needed with respect to detonating explosives 7 to mitigate acoustic shock waves 6.

Gas generating devices 20 and tubing assemblies 30 and 40 of sound mitigating system 10 can be made negatively buoyant to sink to and stay on bottom terrain, or floor 8 in ambient water 5, and/or gas generating devices 20 and tubing assemblies 30 and 40 of sound mitigating system 10 have mounting structure, such as spikes 10b or weights 10c to secure them to bottom 8 during deployment and operation. These features assure that curtain 12 of bubbles 14 being generated by and emitted from system 10 rises and/or percolates upward in a virtually continuous curtain 12 throughout its length. FIG. 2 of the drawings shows bubbles 14 of curtains 12 emitted from system 10 and rising to surface 9 as being uniformly sized and spaced apart to avoid cluttering and confusion in the drawings. In fact, the emitted bubbles 14 form virtually continuous curtains 12 of such bubbles 14, all of bubbles 14 do expand as they rise toward surface 9, and the expanded, or expanding bubbles 14 tend to break-up into further multitudes of bubbles 14 as they continue to rise to assure mitigation of acoustic pressure waves 6.

Gas generating device 20 may have different designs in system 10. Whichever design is selected, it must be capable of generating and/or emitting sufficient volumes of gas to feed the interconnected tubing assemblies 30 and 40 to percolate a sufficiently dense curtain 12 of bubbles 14 upward through water 5 to mitigate shock waves 6. In shallow water, or a near shore application, gas-generating device 20 can be a manifold structure receiving pressurized gas through hoses (not shown) extending to a commercial air compressor or bank of air tanks (not shown) located at surface 9 of water 5. Optionally, each gas-generating device 20 can be compressed air tanks and valve mechanisms submerged at bottom terrain 8 and connected in-line with tubing assemblies 30 and 40.

Gas generating devices 20 are more likely to be in the category of pyrotechnic devices; however, some other chemically reacting compounds that produce gasses could be used. Each gas generating device 20 can have a can-shaped shell 21 of a ferrous or composite material that has sufficient strength and refractory properties to contain a burning solid propellant charge 22 in shell 21. Each propellant charge 22 is initiated, or activated by activation signals over lines 23 connected to it from remote control unit 25 to burn and produce volumes of gas for bubbles 14. The activation of propellant charges 22 can be simultaneous or selective depending on the desired effect. Simultaneous actuation of propellant charges 22 in gas generating devices 20 produces a continuous curtain 12 of bubbles 14 along the length of sound mitigating system 10.

The activation signals can be electromagnetic signals on electrically conducting lines 23 to initiate explosive or pyrotechnic squibs 22a at propellant charges 22. The activation signals can be mechanical vibrations or displacements (tugs, or jerks) on cord-like lines 23 from remote control unit 25 to trip a trigger mechanism 22a' at propellant charges 22 to strike a percussion cap and fire propellant charge 22. Remote control unit 25 can be at a command terminal (not shown), or control unit 25 can be on bottom 8 and a control lead 28 can extend to command terminal that is located at a safer distance from explosives 7 to activate control unit 25.

Each gas generating device 20 contains an amount of propellant charge 22 to generate sufficient volumes of environmentally friendly gases to create a portion of curtain 12 of bubbles 14 via heat resistant tubing assemblies 30 and general tubing assemblies 40. Pressures of the generated gases from gas generating devices 20 that force, or vent the gases through holes 31 and 41 of assemblies 30 and 40 create bubbles 14 of curtain 12. The density of bubbles 14 of curtain 12 produces a sound-mitigating barrier, or attenuator for acoustic outputs caused by detonating explosives 7.

Many compounds are available that can be selected for propellant charges 22 that burn at controlled rates to generate controlled volumes of gases over a useful period of time and will not violently explode and tear apart system 10. This useful period of time is at least the time is takes to create curtain 12 of bubbles 14 that extends from system 10 at bottom 8 to surface 9 of water 5 and, during which, detonation of explosives 7 occurs. Among the many that might be selected, typical compounds for propellant charge 22 have properties of burning at a slow rate, e.g. under seven thousand meters per second (but most likely under a couple of feet per second), producing high gas volumes per unit volume of compound, and burning relatively cool, e.g. in the range of eight to nine hundred degrees Fahrenheit. One such compound for propellant charge 22 is sodium azide. Other compounds that may have different rates of burning, gas volume productions, and burning temperature can be selected as well.

Each side of each of gas generating devices 20 is securely connected to a heat resistant tubing assembly 30. Each heat resistant tubing assembly 30 is comprised of a tube made from heat resistant material, either metal or composite that has sufficient weight to remain on bottom 8 and not be buoyed upward even when it is filled with gas generated in adjacent gas generating devices 20. The refractory material of each heat resistant tubing assembly 30 allows for transition of the hot gases between each of gas generating devices 20 and each general tubing assembly 40 and thereby protects each general tubing assembly 40 from the high temperature gases emitted from each of gas generating devices 20 as propellant charge 22 is being burned. In addition, each heat resistant tubing assembly 30 is perforated to have at least one row of holes 31 on its upper half to vent a first portion of gases generated by gas generating devices 20 as bubbles 14 in part of curtain 12.

A general tubing assembly 40 is connected to each heat resistant tubing assembly 30 to transmit and vent other, or second portions of the gases generated by gas generating devices 20 as bubbles 14 in another part of curtain 12 of bubbles 14. The vented bubbles 14 of curtain 12 from general tubing assemblies 40 along with vented bubbles 14 from heat resistant tubing assemblies 30 complete the length of curtain 12 of bubbles 14 in a sound-mitigating region. Each general tubing assembly 40 has at least one row of holes 41 on its upper half to vent the second portions of the gases generated by gas generating devices 20 as part of curtain 12 of bubbles 14. Holes 41 may be aligned with holes 31.

The sizes and spacing of holes 31 and 41 depend on depth of water 5 where sound mitigating systems 10 are situated, the velocity of currents in ambient water 5, the frequencies of acoustic output from detonating explosive 7, and the depth of explosive 7. Under some scenarios, the distribution and sizes of holes 31 and 41 might be altered along the lengths of heat resistant tubing assemblies 30 and general tubing assemblies 40, respectively. The different distributions and sizes of holes 31 and 41 may be provided for in each heat resistant tubing assembly 30 and each general tubing assembly 40 by adjustable shutters 51 in holes 31 and 41 to provide different densities of bubbles 14 in curtain 12 of bubbles 14 as a particular need or situation may dictate.

Each general tubing assembly 40 is made of flexible material, such as rubber, PVC, or combination of material (i.e. fire hose). Gas generating devices 20, heat resistant tubing assemblies 30, and general tubing assemblies 40 of sound mitigating system 10 have sufficient combined weight or can be sufficiently weighted to keep sound mitigating system 10 in place on bottom 8 after it has been deployed in water 5 and while gases from gas generating devices 20 fill it and are being vented through it. The flexible material of each general tubing section 40 is flexible enough to be bent into a desired shape by tools and/or divers. This feature allows shaping of general tubing assemblies 40 and modification of the overall configuration of sound mitigating system 10 along its length for different attenuation tasks.

The diameters of each heat resistant tubing assembly 30 and general tubing assembly 40 are determined as a function of the net weight, composition, and rate of burning of propellant charge 22. The dimensions of each heat resistant tubing assembly and general tubing assembly 40 also are determined to take into account the depths at which sound mitigating system 10 is deployed and the velocities of currents in ambient water 5. The frequencies to be mitigated from the acoustic outputs from detonating explosive 7 and the depth of explosive 7 are other factors to take into consideration when dimensioning heat resistant tubing assemblies 30 and general tubing assemblies 40.

Gas generating devices 20, heat resistant tubing assemblies 30 and general tubing assemblies 40 can be assembled and coupled together as sound mitigating system 10 at a distant depot, on a vessel on surface 9 above submerged explosives 7, or on bottom 8 by a team of divers. The assembled sound mitigating system 10 can be arranged in a variety of configurations to mitigate acoustic outputs from detonating explosives 7. The drawings show sound mitigating system 10 shaped in a semicircle, or crescent-shape to the right of explosives 7 on bottom 8. This shape creates a semicircular or crescent shaped curtain 12 of bubbles 14. If desired, sound mitigating system 10 could be formed as a complete circle spaced from and around explosives 7, straight line, or any other practicable shape to mitigate the shock waves 6 coming from detonating explosives 7 so that volumes, or areas of interest on the other side of sound mitigating system 10 do not receive the same intensities.

More or less gas generating devices 20, heat resistant tubing assemblies 30, and general tubing assemblies 40 are coupled together until the desired length is reached for different configurations or lengths for different sound mitigating systems 10 to accommodate different explosives 7 and/or areas. Then, flexible general tubing assemblies 40 are selectably bent until the desired shape is reached. Suitable mating couplings 24, 34, and 44 can be provided at the ends of gas generating devices 20, heat resistant tubing assemblies 30, and general tubing assemblies 40 to permit expedient tailoring of sound mitigating system 10. These couplings 24, 34, and 44 can be mating male-and-female threaded structure, standard quick-connect pipe fitting structure, etc. Gas generating devices 20 at the ends of sound mitigating system 10 have their ends 20a closed.

FIG. 2 shows semicircular, or crescent-shaped sound mitigating system 10 next to a virtually identical sound mitigating system 10' to increase mitigation of acoustic pressure waves 6 coming from detonating explosives. The areas, or volumes to the right of these systems 10, 10' will be subjected to mitigated pressures. More sound mitigation systems 10, 10' that might be differently shaped can be layered, or spaced apart from one another depending on the extent of mitigation practicably desired and the net explosive weight of the explosives 7. A common control unit 25 can be connected to all gas generating devices 20 of all systems 10, 10', etc.

The layered sound mitigation systems 10, 10', etc. create a plurality of layered virtual curtains 12 of bubbles 14 that extend from bottom terrain 8 of water 5 to surface 9. The plurality of curtains 12 of bubbles 14 are layered with respect to one another between detonating explosives 7 and areas of interest located to the right of the systems.

Having the teachings of this invention in mind, modifications and alternate embodiments of sound mitigating system 10 may be adapted. Its uncomplicated design lends itself to numerous modifications to permit its use in the hostile marine environment. For examples, the constituents of sound mitigating system 10 can be made larger or smaller to produce effective curtains 12 of bubbles 14 at different operational depths of deployment and be fabricated from a wide variety of materials to assure sufficient strength and long term reliable operation under adverse operational conditions. Gas generating devices 20 could have different shapes, and couplings 24, 34, and 44 could have different arrangements of different numbers of differently shaped structural members to engage devices 20 and tubing assemblies 30 and 40. Control unit 25, squibs 22a and trigger mechanisms 22a' could be modified to be actuated by acoustic or magneto-electric signals.

A modification of sound mitigation system 10 could utilize sand, or other heavier-than-water particulate matter that is dropped through water 5 in a virtually continuously extending curtain to mitigate acoustic pressure waves. The constituents of the embodiment of sound mitigating system 10 shown in FIG. 1 could be modified to be buoyant and float at surface 9. The components designated 20 could be containers of particulate-like matter, such as sand, for example. The sand could by fed from containers 20 to tubing assemblies 30 and 40 by conveyor-like mechanisms, or compressed gas feeder arrangements, for examples. Grains of sand would be dropped through holes 31 and 41 that are now oriented to be downwardly facing. The curtain of sand, or other particulate-like matter falling through water 5 will serve to mitigate the acoustic pressure waves coming from exploding explosives 7.

The disclosed components and their arrangements as disclosed herein, all contribute to the novel features of this invention. Sound mitigating system 10 is an uncomplicated, cost-effective, system that can be deployed, left in place for prolonged periods of time, and be reliably used when needed at a later date. Therefore, sound mitigating system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A system for mitigating sound underwater comprising:
a plurality of gas generating devices each producing volumes of gas;
a plurality of heat resistant tubing assemblies, at least one heat resistant tubing assembly being connected to each gas generating device to receive said volumes of gas, each heat resistant tubing assembly having holes to vent one portion of said volumes of gas into ambient water;
a plurality of general tubing assemblies each connected to a separate heat resistant tubing assembly, each general tubing assembly having holes to vent a second portion of said volumes of gas into ambient water.

2. The system of claim 1 wherein said gas generating devices, heat resistant tubing assemblies, and general tubing assemblies are disposed at bottom terrain beneath said ambient water and said vented first portions and vented second portions create a curtain of bubbles in said ambient water extending from said bottom terrain to surface of said ambient water.

3. The system of claim 2 wherein said gas generating devices each include propellant charge in a shell, said heat resistant tubing assembly includes a tube of refractory material, and said general tubing assembly includes a tube of flexible material.

4. The system of claim 3 further comprising:

a remote control unit having leads connected to said propellant charge for activation of said propellant charge to produce said volumes of gas.

5. The system of claim 4 further comprising:

couplings interconnecting said gas generating devices, heat resistant tubing assemblies, and general tubing assemblies.

6. The system of claim 5 wherein said gas generating devices, heat resistant tubing assemblies, and general tubing assemblies are negatively buoyant to sink them to said bottom terrain.

7. The system of claim 6 further comprising:

mounting structure connected to said gas generating devices, heat resistant tubing assemblies, and general tubing assemblies to secure them to said bottom terrain.

8. The system of claim 7 wherein said couplings, gas generating devices, heat resistant tubing assemblies, and general tubing assemblies sound mitigating system are connected in a crescent shape.

9. The system of claim 8 wherein a plurality of interconnected couplings, gas generating devices, heat resistant tubing assemblies, and general tubing assemblies are located on said bottom terrain to vent a plurality of said curtains of bubbles to increase mitigation of acoustic pressure waves.

10. A method of mitigating acoustic output from explosions underwater comprising the step of:

creating a virtual curtain of bubbles extending from bottom terrain to surface of a body of water, said curtain separating detonating explosives and an area of interest;

generating volumes of gas in a plurality of gas generating devices; and coupling said volumes of gas to heat resistant tubing assemblies and general tubing assemblies from gas generating devices.

11. The method of claim 10 wherein said step of generating includes the step of:

activating a propellant charge in each gas generating device by a control unit.

12. The method of claim 11 further comprising the steps of:

venting first portions of said volumes of gas through holes in said heat resistant tubing assemblies; and venting second portions of said volumes of gas through holes in said general tubing assemblies, said first and second portions forming said virtual curtain of bubbles.

13. The method of claim 12 further comprising the step of:

forming said gas generating devices, heat resistant tubing assemblies and general tubing assemblies in a semicircular shape to produce a semicircular-shaped curtain of bubbles.

14. The method of claim 13 further comprising the step of:

creating a plurality of virtual curtains of bubbles from bottom terrain of a body of water to the surface of a body of water, said plurality of curtains of bubbles being layered with respect to one another and disposed between detonating explosives and an area of interest.

15. An underwater sound mitigating apparatus comprising:

means for generating volumes of gas;

means for providing heat resistant tubing assemblies being connected to said gas volumes generating means to receive said volumes of gas, said heat resistant tubing assembly providing means having holes to vent first portions of said volumes of gas into ambient water;

means for providing general tubing assemblies being connected to said heat resistant tubing assembly providing means, said general tubing assembly providing means having holes to vent second portions of said volumes of gas into ambient water, said first and second portions of said volumes being vented as a virtual curtain of bubbles in ambient water.

16. The apparatus of claim 15 wherein said generating means is comprised of at least one source of compressed gas.

17. The apparatus of claim 15 wherein said generating means is propellant charges in shells and said holes have shutters in them.

18. A system to mitigate sound underwater comprising:

a plurality of containers each containing volumes of particulate-like matter, said particulate-like matter being heavier than water and;

a plurality of tubing assemblies, said tubing assemblies being connected to said containers to receive said volumes of particulate matter, each tubing assembly having holes to drop said volumes of particulate-like matter into ambient water, said containers and said tubing assemblies being positively buoyant to float at the surface of said ambient water and said volumes of dropped particulate matter forming a virtual curtain of falling particulate-like matter.

19. The system of claim 18 wherein said matter is sand.

* * * * *